United States Patent [19]

McMillan

[11] Patent Number: 5,390,073
[45] Date of Patent: Feb. 14, 1995

[54] DIELECTRIC MATERIAL CONTAINING DIPOLAR MOLECULES

[75] Inventor: William G. McMillan, Los Angeles, Calif.

[73] Assignee: Maxwell Laboratories, Inc., San Diego, Calif.

[21] Appl. No.: 2,916

[22] Filed: Jan. 11, 1993

[51] Int. Cl.$^6$ .......................... H01G 4/04; H01G 4/08
[52] U.S. Cl. ................................ 361/327; 361/323; 252/575
[58] Field of Search .............. 361/314, 315, 319, 323, 361/327; 252/570, 575, 577; 524/236

[56] References Cited

U.S. PATENT DOCUMENTS

| | | | |
|---|---|---|---|
| 3,499,791 | 3/1970 | Maloney | 524/236 |
| 3,684,932 | 8/1972 | Ross et al. | 361/315 |
| 3,740,625 | 6/1973 | Ross et al. | 361/315 |
| 3,774,090 | 11/1973 | Ross et al. | 361/315 |
| 3,855,508 | 12/1974 | Ross et al. | 361/315 |
| 4,586,111 | 4/1986 | Cichanowski | 361/323 |

OTHER PUBLICATIONS

J. Kircherova, et al., "Dielectric Increments and the Conformations of Amino Acids and Betaines in Water," Journal of Physical Chemistry, 80(18), pp. 1974–1980, 1976.

*Primary Examiner*—Mark H. Paschall
*Assistant Examiner*—Gregory L. Mills
*Attorney, Agent, or Firm*—Fitch, Even, Tabin & Flannery

[57] ABSTRACT

Dielectric materials having a high dipole moment density are provided. The high dipole moment density is achieved by the use of a substituted α-amino acid, such as N-trimethyl glycine and related homologues having nonpolar sidechain groups, with three alkyl substitutions on the nitrogen of the α-amino group. These molecules have a high dipole moment and small volume, allowing rapid rotation around the α-amino, carboxyl dipole. N-trimethyl glycine alone or in combination with one or more homologues is preferably provided as a solute in a liquid dielectric solution. Alternatively, these molecules are provided as substituents on a linear polymer.

12 Claims, 1 Drawing Sheet

DIELECTRIC MATERIAL CONTAINING DIPOLAR MOLECULES

FIELD OF THE INVENTION

The present invention relates to a dielectric material for use in electrical capacitors, and more particularly, to the use of N-substituted α-amino acids as a component of dielectric materials in a capacitor.

BACKGROUND

Capacitors are devices for storing electrostatic energy through the separation of electric charges of opposite signs. All capacitors share a common structure of a pair of parallel metallic electrodes or "plates" separated by a layer of dielectric material. The capacitor is "charged" by transferring electric charge from one electrode to the other under the action of an applied potential difference, thus establishing an electric field within the dielectric material. Capacitors used for low voltage operations are typically constructed in the form of stacked flat multilayers of alternating dielectric and electrode sheets. Large capacitors used for high voltage operations are typically constructed by winding together in a cylinder dielectric film interleaved with metal electrode foil.

The dielectric material is a nonconducting medium which can serve to hold an electric field. The medium may be a solid, liquid, gas, or combination of these. A number of materials have been used as dielectrics including paper, mica, high-polymer plastic films (e.g., polypropylenes, polyethylenes, polystyrenes, polyesters, polyimides) and ceramics such as glass and metal-oxide ceramics. Each type of dielectric material has a characteristic dielectric permittivity. This is a measure of the rate of increase of the charge that can be stored in a capacitor with increase in the potential difference (voltage) applied across the electrodes, and is directly proportional to the capacitance.

Capacitors are used for a broad range of electrical applications, such as DC filters in power supplies, timing circuits, coupling or decoupling components, frequency tuning, and energy storage. Energy storage capacitors are designed primarily for use in high-power electrical applications that require delivery of high-power pulses over specific times. The amount of energy that is stored in these capacitors ranges from a few joules to greater than 50 kilojoules. A number of existing industrial and military applications require electrical capacitors having high-energy-density storage and high-power- delivery capabilities. Applications such as pulsed magnetic forming and welding of metals, explosive shearing, or highly penetrating X-ray imaging, for example, require the delivery of repetitive bursts of power in short pulses. Examples of potential future applications include the electrical launch of military projectiles or missiles from mobile vehicles, and auxiliary power for rapid acceleration of electrically-driven automobiles.

In order for high energy and high power applications to be viable in mobile systems, a small sized capacitor is required rather than the large volume capacitor banks currently employed to generate high bursts of power. There is thus a need in the art for a relatively small-sized capacitor that can store and discharge large bursts of electrical energy at high density.

Many of the high energy applications currently employ chemical storage batteries because chemical storage can provide a higher energy density than can be achieved using the electrical energy storage of capacitors. However, electrostatic energy storage is preferable in many cases because an electrical impulse from a charged capacitor can be delivered in a much shorter time and thus at much higher power than can an equivalent amount of energy developed from a chemical storage battery.

In order to increase the storage and delivery capabilities of electrical capacitors, while retaining the small size desirable for new applications, it is necessary to increase the energy density, or the amount of energy stored per unit volume, of the capacitor. This can be accompanied by increasing either (or both) the dielectric permittivity or the maximum tolerable electric field—i.e., the dielectric breakdown strength. Increasing the dielectric permittivity may be achieved in a number of ways, such as increasing the number density and magnitude of dipolar molecules or groups in a dielectric material. The ability of the polar groups or dipoles to become oriented in an electric field contributes to the dielectric properties of a material. U.S. Pat. No. 4,586,111 to Cichanowski, for example, teaches the use of polymers having flexible backbones which allow rotational freedom of the substituents, as a method of increasing the dielectric permittivity of a dielectric material.

It is therefore an object of the present invention to provide dielectric materials suitable for the construction of small, compact energy-dense capacitors capable of delivering large amounts of power.

SUMMARY OF THE INVENTION

The present invention provides dielectric materials having a high dipole moment density for use in capacitors. The high dipole moment density is made possible by the incorporation of molecules having both high dipole moments and compact structures. These molecules, which can be one or a mixture of N-trialkyl substituted α-amino acids, enhance the polarizability and permittivity of the dielectric medium by their ability to be oriented in response to an applied electric field.

Preferred molecules for use in dielectric materials in accordance with the invention include N-trimethyl glycine and other N-trimethyl substituted α-amino acid homologues.

Advantageously, the N-trialkyl substituted α-amino acid molecules may be provided either as a solute in a liquid or solid dielectric material, or as a substituent on a polymer component of a dielectric material.

BRIEF DESCRIPTION OF THE DRAWINGS

The above and other aspects, features, and advantages of the present invention will be more apparent from the following more particular description thereof, presented in conjunction with the following drawings wherein.

DETAILED DESCRIPTION OF PREFERRED EMBODIMENTS

Figure 1:
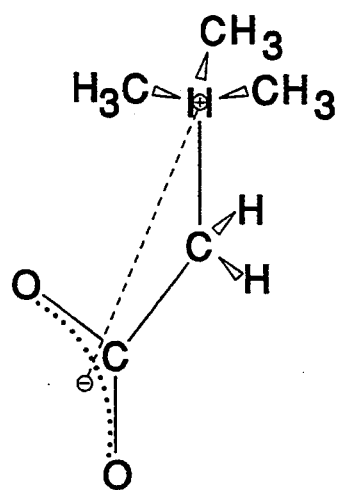
FIG. 1 shows the molecular structure and charge distribution of N-trimethyl glycine.

The following description is of the best mode presently contemplated for carrying out the invention. This description is not to be taken in a limiting sense, but is made merely for the purpose of describing the general principles of the invention. The scope of the invention should be determined with reference to the claims.

All U.S. patents cited herein are incorporated by reference into the present application unless otherwise indicated.

Unless otherwise defined, all technical and scientific terms used herein have the same meaning as is commonly understood by one of skill in the art to which this invention belongs.

As used herein the term "capacitance" is expressed by the equation C as a function of voltage $=dQ/dV$ where C is capacitance measured in farads, Q is the quantity of charge in coulombs, and V is the applied voltage in volts. Depending upon its magnitude, capacitance can be expressed in farads, F, microfarads, $\mu F=10^{-6}$ F, or picofarads $pF=10^{-12}$ F.

As used herein the term "dielectric" refers to an electrically insulating material or medium. Examples include wood, paper, ceramics, glass, plastics, and rubbers. Dielectric materials are classified according to the ease with which charge can be transferred and their ability to reverse the charge transfer upon demand. This ability is a combination of the dielectric permittivity of a material and the dielectric strength.

As used herein the term "dielectric permittivity $\epsilon$" is an expression of the absolute dielectric properties of a material or medium. The dielectric permittivity is directly proportional to capacitance C, and is defined according to the equation $C=\epsilon A/l$, wherein A is the area of the electrodes and l is the distance between them. In combination with the definition $C=dQ/dV$ given earlier, this equation indicates that the greater the permittivity $\epsilon$, the greater the charge that can be stored on the electrodes for a given potential difference. The dielectric permittivity is also expressed as the differential coefficient of rate of change of the displacement field D, the external charges applied to the electrodes of the capacitor, with the electric intensity E, the macroscopic force field averaged over the dielectric medium, or $\epsilon=dD/dE$, in units of coulomb/per volt-meter, or farad per meter.

As used herein the term "relative permittivity" or "dielectric constant k" refers to the ratio of the permittivity $\epsilon$ of a dielectric material to that $\epsilon_0$ of a vacuum, or $k=\epsilon/\epsilon_0$, wherein $\epsilon_0$ is $8.85\times10^{-12}$ farad per meter. The permittivity of some dielectric materials decreases with increasing field strength. Typically, the dielectric permittivity decreases as the frequency of the applied energy is increased.

As used herein the term "dipole moment $\mu$" refers to an asymmetric charge distribution inside a neutral molecule. The dipole moment is considered to be the product of the magnitude of the charges multiplied by the distance of separation between the charges. Dipole moment is measured in units of debye. In the vapor phase, the water molecule, for example, has a dipole moment of 1.84 debye.

As used herein the term "polarizability $\alpha$" refers to a measure of the ability of a molecule or substituent group exposed to an electric field to develop a dipole moment $\mu$ along the direction of the field, by displacement of its electrons relative to the nuclear framework, and through partial alignment of any permanent dipole moments present. The total polarization P of a dielectric material is the molecular number density n times the dipole moment $\mu$. Three types of responses within the dielectric material contribute to the polarization P of a dielectric material. They are first, the electronic polarizability $\alpha_\epsilon$, or the dipole moment resulting from the induced displacement under the local electric field of the negative electrons relative to the positively charged atomic nuclei. The second is the orientation polarizability $a_\mu$, resulting from the partial alignment of the permanent bond dipoles along the local electric field. The third is the distortion polarizability $\alpha_d$ resulting from the bending and stretching of the chemical bonds within the molecules that tie together atoms bearing different formal charges, owing to their different electronegativities.

As used herein, the term "$\alpha$-amino acids" refers to ampholytic compounds having an amino group attached to the carbon atom (in position $\alpha$) adjacent to the carboxylic group which also have some sidechain group covalently attached to the $\alpha$-carbon. The $\alpha$-amino acids are generally classified according to their side-chain groups, i.e. as nonpolar, uncharged polar, acidic, and basic. The sidechain group of an amino acid is herein designated by $R_1$. $\alpha$-Amino acids having non-polar $R_1$ groups include, for example, alanine, valine, leucine, isoleucine, proline, phenylalanine, tryptophan, and methionine.

As used herein, the term "N-alkyl substituted amino acids" refers to $\alpha$-amino acids having alkyl groups substituted onto the nitrogen of the $\alpha$-amino group. The alkyl groups substituted onto the $\alpha$-nitrogen are designated by $R_2$, $R_3$ and $R_4$, with the sidechain group of the amino acid being designated by $R_1$. As used herein the term "N-trialkyl substituted amino acids" refers to $\alpha$-amino acids having three alkyl groups $R_2$, $R_3$, and $R_4$ substituted onto the nitrogen of the $\alpha$-amino group.

The present invention provides dielectric materials having high dipole moment densities made possible by the presence of certain molecules characterized by both a high dipole moment and a small volume. The molecules contained in the dielectric material are one or a mixture of N-trialkyl substituted $\alpha$-amino acids of the formula

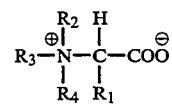

wherein $R_1$ is a sidechain group of the amino acid as are known in the art, and $R_2$, $R_3$, and $R_4$ are alkyl substituents on the nitrogen of the $\alpha$-amino group. The substituents $R_2$, $R_3$, and $R_4$ on the $\alpha$-amino group are short-chain alkyl groups, preferably of three carbons or less in length, and most preferably methyl groups. $R_2$, $R_3$, and $R_4$ may be the same or different alkyl groups. The N-trialkyl substituted amino acids of the present invention are preferably those amino acids having hydrogen or a non-polar group as $R_1$.

The most preferred N-trialkyl $\alpha$-amino acid is N-trimethyl glycine, or betaine, which is the amino acid glycine with three methyl groups substituted onto the $\alpha$-amino nitrogen. The chemical structure of betaine is shown in FIG. 1.

N-trialkyl substituted $\alpha$-amino acids having non-polar sidechain $R_1$ groups include, for example, substituted alanine, valine, leucine, isoleucine, proline, phenylalanine, tryptophan, and methionine. Preferred N-substituted amino acids are those having non-polar $R_1$ groups which are sufficiently small so as to retain the small volume of the overall molecule, such as those having four or fewer carbons, for example. (substituted alanine, valine, leucine, and isoleucine). Preferred N-trialkyl substituted α-amino acids are chosen from those having non-polar $R_1$ groups, because non-polar groups do not interfere with the strong dipole existing between the substituted α-amino group and the α-carboxylic group.

Amino acids are present in neutral aqueous solutions or in solid crystalline form as a dipolar molecule or zwitterion, with a positive charge residing on the nitrogen of the α-amino group, and a negative charge residing on the resonating carboxyl ion group. The substitution of three rather than two alkyl groups on the α-nitrogen similarly confers a positive charge on the nitrogen, which forms a dipole with the resonating carboxyl group. The high dipole moment of α-amino acids and substituted α-amino acids is a consequence of the transfer of a full electron charge from the nitrogen atom to the carboxyl group.

Methyl groups rather than elongated or branched alkyl groups are preferably substituted on the α-nitrogen, because this preserves the compact size of the substituted α-amino acids. The compact size facilitates rotation of the dipole moment of the substituted α-amino acids in an applied electric field.

The dielectric permittivity of dielectric material containing the substituted molecules of the present invention is influenced in particular by the orientation polarization of the dipoles of these molecules. Orientation polarization is the partial alignment of permanent dipole moments along the local electric field generated when an external field is applied to the capacitor. Therefore, the ability of the dipoles to rotate and align themselves in response to the applied field is crucial in obtaining a dielectric material with a high permittivity. Advantageously, as solutes in a solution, preferably a polar solution, the substituted α-amino acids are free to rotate in response to an external field. As substituents on polymers, the α-amino acids are attached so as to maintain the ability of the substituted α-amino acids to rotate.

The most preferred molecule, N-trimethyl glycine (betaine), has a high dipole moment of approximately 10 debye resulting from the positive charge centered on the α-nitrogen, and the negative charge centered on the resonating carboxyl group. The positive and negative charges are separated by a distance estimated to be approximately 3 angstrom units. This most preferred molecule also has a high degree of molecular mobility at the expected temperature of use of approximately 25° C. The compact size of betaine facilitates rotation of the dipole set up between the α-nitrogen, and the carboxyl group. The compact size is a consequence of the small volume of the carbon and nitrogen atoms, which have the atomic numbers 6 and 7 respectively.

Betaine is present as a solid at room temperature, and is soluble in polar solvents. This molecule is widely distributed in plant or animal material and may be isolated by purification methods known to those in the art. Betaine may also be produced synthetically from glycine, see, for example, Edsall, J. (1943) *J. Am Chem. Soc.* 65, 1767. Substituted amino acids generally are obtained by chemical modification of amino acids. α-amino acids are generally commercially available, or may be obtained by fermentation processes, or synthetically according to methods known in the art. Glycine and alanine, for example, are commonly chemically synthesized. See, for example, T. Kaneko, et al. (1974) *Synthetic Production and Utilization of Amino Acids*, John Wiley & Sons, Inc., New York.

Betaine and other homologues may be provided as a solute or mixture of solutes in a solution as a part of a dielectric material. The polar solvent further enhances the permittivity of the dielectric media. The rotation of permanent dipoles towards alignment with the applied field involves the cooperative movement of the solvent molecules. Solvents having high viscosity would create resistance to the ability of solute dipoles to align in response to an applied field. In addition solvents having a high degree of thermal agitation would promote randomized orientation of the solute dipoles. Preferred solvents are highly oxygenated non-viscous polar liquids, such as methyl alcohol, ethyl alcohol, and ethyl ether. (Although betaine and other homologues are soluble in water, water reduces the dielectric strength.)

Liquid solutions containing the preferred molecules as a solute can be used to impregnate a suitable dielectric material, such as Kraft paper or a polymer film. For example, U.S. Pat. No. 3,855,508 to Ross et al., the disclosure of which is incorporated herein by reference, describes the use of low viscosity liquid ester dielectric materials including blends and mixtures of such esters with alcohols and acids to impregnate suitable solid materials, such as porous cellulose or highly branched polypropylene film. Liquid dielectric material can also be applied as a coating directly to a dielectric film, such as a plastic film or some other solid support according to methods known in the art.

Betaine and other N-trialkyl substituted homologues can also be employed as substituents on polymers in such a way so as to preserve the ability of the dipole moment to rotate in response to the electric field. Preferred polymers are linear polymers with flexible backbones allowing for rotation of the substituents. The preferred polymers are those having glass transition temperatures, $T_g$, which lie below the normal operating temperature of the capacitor. At sufficiently low temperatures, polymers exist in a quasi-crystalline state with a correspondingly rigid structure that strongly resists rotation of the bond dipole moments. Upon heating above the glass transition temperature, the crystallinity disappears in favor of a disordered glass-like structure, which allows greater rotational freedom and thus increases the dielectric permittivity. Examples of preferred polymers having flexible backbones and low $T_g$ include vinyl polymers, such as polyvinyl chlorides, and methyl methacrylate polymers, which form amorphous polymers. In addition, other polymers particularly those having flexible backbones, such as C—O—C ether linkages as a backbone, are preferred. Such linkages provide the polymer with inherent chain flexibility owing to the absence of steric hindrance and enhanced rotational freedom about the carbon-oxygen-carbon bonds. Such molecules are taught, for example, in U.S. Pat. No. 4,586,111 to Cichanowski, the disclosure of which is incorporated herein by reference. This patent teaches the use of polyacrylate polyether pre-polymers that have a high degree of molecular mobility at room temperature (25° C.), for example, due to the rotational freedom of the ether (C—O—C) linkages. This rotational freedom is preserved when the pre-polymers are polymerized into homopolymers or copolymers, due to the flexibility of the backbone. The dielectric constant of the dielectric material is therefore increased due to the rotational motion of these molecules.

The preferred N-trialkyl substituted α-amino acid homologues of the present invention are attached to a polymer of choice at one of the alkyl groups substituted onto the α-nitrogen. This is preferably accomplished by radiation curing, or the use of ionizing electromagnetic radiation to remove hydrogens from both the intended substituent, and the preformed polymer substrates, to form excited radical intermediates. Hydrogens are specifically removed from one of the alkyl groups substituted onto the α-nitrogen of the substituted amino acids. Similarly, hydrogens are removed from a preformed polymer, and the radical intermediates coupled to add the substituted α-amino acids as a substituent to the polymer. α, β, γ, X-ray, ultraviolet radiation, or high energy electron sources may be used in this procedure. This procedure may also be performed using monomers or oligomers such as vinyl monomers or oligomers rather than preformed polymers. These monomers are polymerized in the presence of N-substituted α-amino acids under ionizing radiation to form substituted polymer, preferably in the form of a gel or cross-linked material.

The addition of N-trimethyl glycine to a polymer such as methyl methacrylate, for example, is performed by first solubilizing the N-trimethyl glycine in water. The solubilized N-trimethyl glycine is then dispersed in methyl methacrylate or other polymers, or oligomers, or monomers, and exposed to radiation to form a cross-linked polymer which takes the form of an amorphous gel.

N-trimethyl glycine and related homologues may be attached to polymers which are present as a solid or liquid dielectric material at the temperature of use of the capacitor. These molecules may be attached to homopolymers or copolymers to achieve the desired properties of a dielectric material.

N-trimethyl glycine and related homologues attached to vinyl and acrylic and other polymers described herein become a part of a solid dielectric material. This material is preferably in the form of linear high-polymer plastic film dielectrics. These films are typically extruded or melt-cast, and are usually subjected to uni- or bi-axial stretching prior to metallizing and/or winding as a dielectric material.

The N-trialkyl substituted α-amino acids of the present invention may also be substituted onto polymers in a liquid state, which can then be used to coat or impregnate solid dielectric materials. For example, the N-trialkyl substituted α-amino acids may be used as substituents on such ester and amide polymers present as liquids at the temperature of use in the capacitors. Such liquid polymers are described, for example, in U.S. Pat. No. 3,684,932 to Ross et al. and U.S. Pat. No. 3,740,625 to Ross et al., the disclosure of which is incorporated herein by reference.

Figure 2:
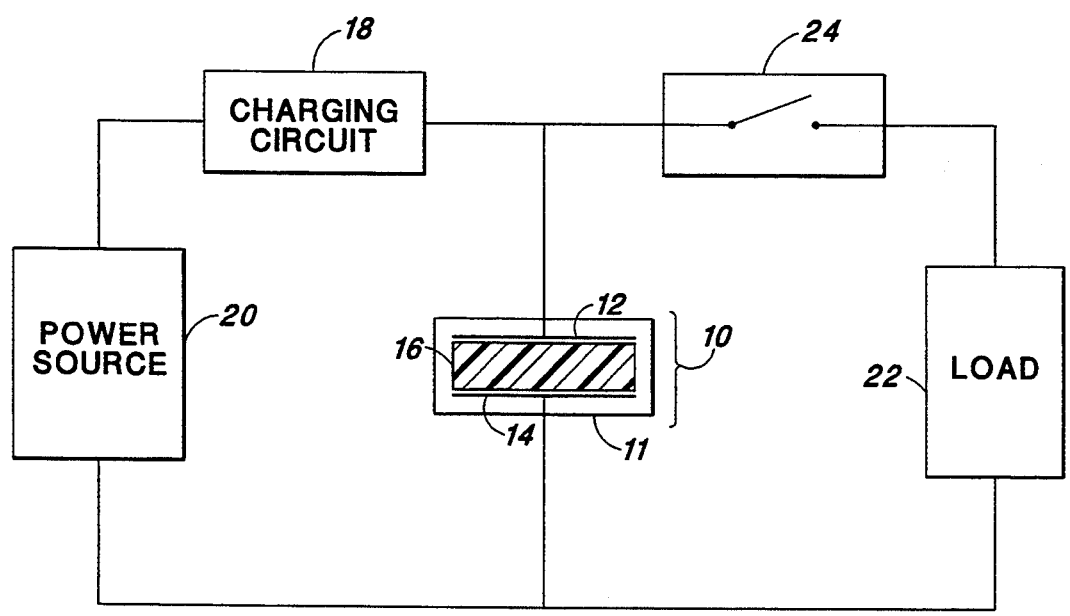
FIG. 2 shows a diagram of a capacitor containing a dielectric material incorporated in a schematic circuit.

The high dipole densities of the molecules of the present invention provides a dielectric material capable of storing high free energy density, i.e. greater than about 4 megajoules per cubic meter. This allows a high voltage to be stored on a capacitor of small volume. Using such dielectric materials, a capacitor having a high free energy density is realized. Such a capacitor may be used in any electrical circuit where a high power discharge is required. For example, as shown in FIG. 2, a capacitor 10, having a capacitor housing 11 and electrodes 12 and 14 separated by a dielectric material 16, is connected through a suitable charging circuit 18 to an available power source 20. The power source 20 places an electric field across the capacitor 10. Once the capacitor 10 is charged, it holds the charge until the particular application requires that the charge be delivered to a load 22. A delivery circuit 24, which functions essentially as a switch, electrically connects the capacitor 10 to the load 22 at the particular time when the energy stored in the capacitor is needed at the load. Such a capacitor is advantageously used in applications such as an electric gun launcher, which would produce sufficient power to launch a projectile without a gunpowder explosion. Such capacitors having high energy density storage are also expected to be useful in applications for which chemical batteries are now employed, such as providing rapid acceleration for electric cars.

The present invention provides a dielectric material with a high dipole moment density, from the use of N-trialkyl substituted α-amino acids, such as N-trimethyl glycine. The molecules have both a large dipole moment and small volume allowing rapid molecular rotation. Such molecules may be included in the dielectric material either as a solute or a substituent on a flexible polymer chain. This high dipole density dielectric is useful for the construction of capacitors which provide high energy output for small volume, high power applications.

Although the invention has been described with reference to the presently-preferred embodiments and applications thereof, it is understood that various modifications can be made without departing from the spirit of the invention. Accordingly, the invention is limited only by the following claims.

Various features of the invention are emphasized in the claims which follow.

What is claimed is:

1. A capacitor including at least two electrodes separated by a dielectric material, wherein said dielectric material comprises at least one N-trialkyl substituted α-amino acid of the formula:

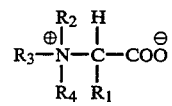

wherein $R_1$ is chosen from the group consisting of hydrogen and a non-polar group; and $R_2$, $R_3$, and $R_4$ are alkyl groups having no more than three carbon atoms.

2. The capacitor according to claim 1 wherein said alkyl groups $R_2$, $R_3$, and $R_4$ are methyl groups.

3. The capacitor according to claim 2 wherein said trialkyl substituted material includes N-trimethyl glycine.

4. The capacitor according to claim 3 wherein said dielectric material includes a solution wherein such N-trimethyl glycine is present as a solute.

5. The capacitor according to claim 4 wherein said solution includes a polar solvent selected from the group consisting of methyl alcohol, ethyl alcohol, and ethyl ether.

6. The capacitor according to claim 3 wherein said dielectric material includes a polymer component having N-trimethyl glycine as a substituent thereupon.

7. The capacitor according to claim 6 wherein said N-trimethyl glycine is attached to said polymer by removal of a hydrogen atom from one of the methyl groups, $R_2$, $R_3$, or $R_4$.

8. The capacitor of claim 7 wherein said polymer has a linear backbone chain.

9. An electrical capacitor comprising a housing, a capacitance section within said housing, said section having at least one pair of spaced-apart electrodes and a dielectric material between said electrodes, wherein said dielectric material comprises a polymer component having N-trimethyl glycine as a substituent which is attached to said polymer component through one of the methyl groups of said N-trimethyl glycine.

10. The capacitor of claim 9 wherein said dielectric material comprises a polymer of methyl methacrylate.

11. An electric capacitor of small size and compact energy-density, capable of delivering large amounts of power, which capacitor comprises a housing, a capacitance section within said housing, said section having at least one pair of spaced-apart electrodes and a dielectric material between said electrodes, wherein said dielectric material comprises a solution including N-trimethyl glycine.

12. The capacitor of claim 11 wherein the dielectric is in a liquid solution consisting of a polar solvent selected from the group including of methyl alcohol, ethyl alcohol, and ethyl ester.

* * * * *